UNITED STATES PATENT OFFICE.

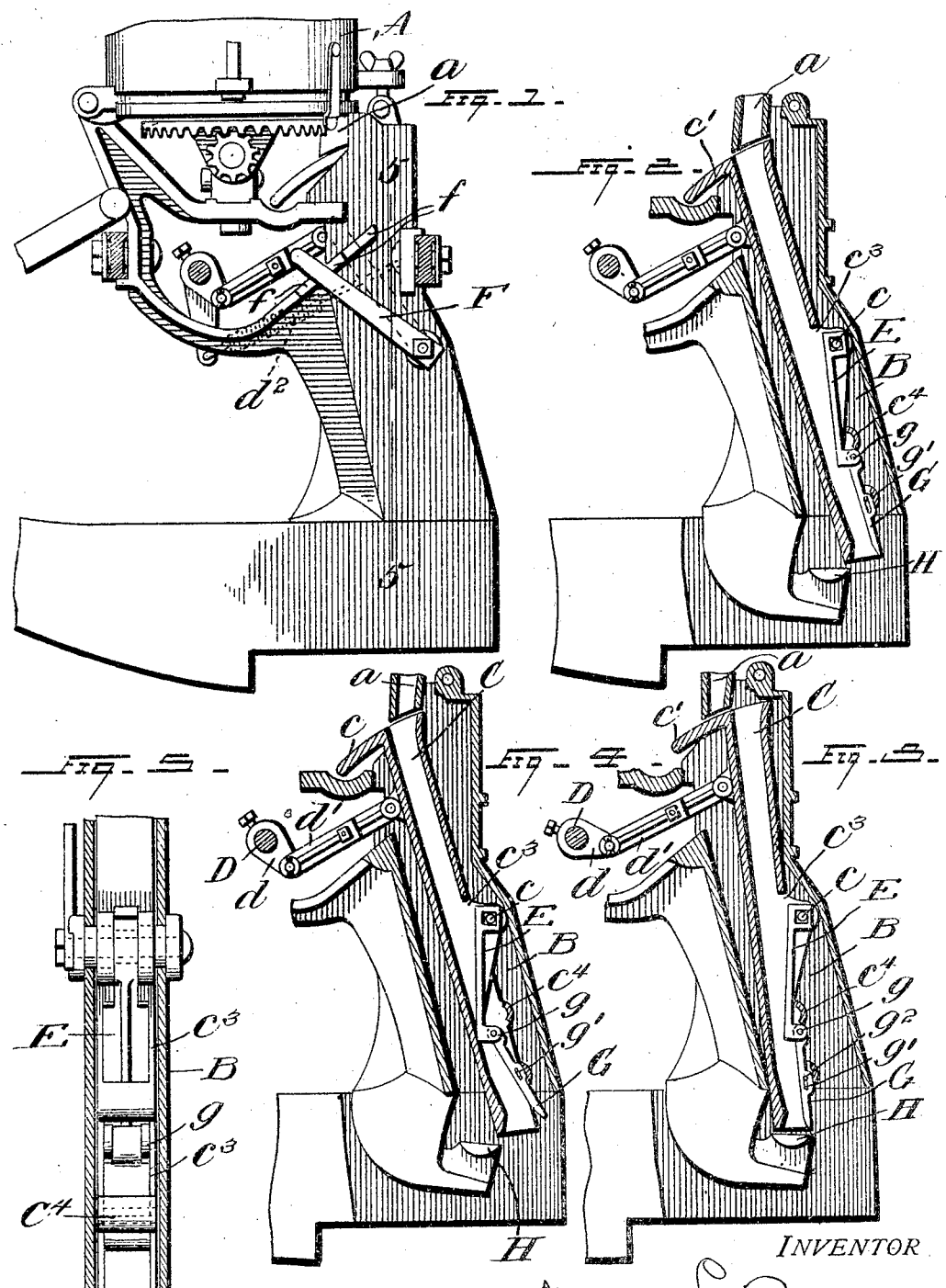

WILLIAM L. BEALL, OF ALBION, MICHIGAN, ASSIGNOR TO GALE MANUFACTURING COMPANY, OF ALBION, MICHIGAN.

DISCHARGE-CHUTE FOR CORN-PLANTERS.

No. 802,066.  Specification of Letters Patent.  Patented Oct. 17, 1905.

Application filed August 17, 1905. Serial No. 274,598.

*To all whom it may concern:*

Be it known that I, WILLIAM L. BEALL, a citizen of the United States, residing at Albion, in the county of Calhoun and State of Michigan, have invented certain new and useful Improvements in Discharge-Chutes for Corn-Planters; and I do hereby declare the following to be a full, clear, and exact description of the invention, such as will enable others skilled in the art to which it appertains to make and use the same.

My invention relates to new and useful improvements in discharge-chutes for corn-planters, and particularly to those of the check-row type.

The object of my invention is to produce a chute which will discharge the kernels of corn equally as well for either drill or check-row planting, but which when employed in check-row planting will insure each group of kernels being discharged so as to form a separate and distinct hill. With chutes as heretofore constructed it has been found difficult to obtain good results in this regard, inasmuch as a sudden jerk on the check-row, which is often caused by fast-walking teams, would throw the kernels against the rear wall of the chute, with the obvious result that they would not be discharged simultaneously, but would be discharged irregularly, according to the manner and time in which they come in contact with the rear of the chute. In order to overcome this difficulty, I employ the novel construction illustrated in the accompanying drawings, of which a full and exact description is contained in the annexed specification.

In the accompanying drawings, Figure 1 is a side elevation of a portion of a corn-planter, showing a portion of the hopper and the chute. Figs. 2, 3, and 4 are vertical sections through the chute, showing the parts thereof in different positions; and Fig. 5 is a vertical section through Fig. 1 on line 5 5.

In the several views like letters of reference designate similar parts of my improved device.

A in the drawings designates the hopper of ordinary or preferred construction, provided with a suitable discharge-opening $a$ over the discharge-chute B. C is a tube pivotally mounted in said discharge-chute B at $c$ and is constructed to be thrown into and out of registration with the discharge-opening $a$, said tube being provided with a cut-off projection $c'$, adapted to close said opening $a$ when said tube is thrown out of registration therewith. D is the check-row shaft, suitably mounted on the planter-frame and is provided with the arm $d$, which is connected by link $d'$ to said tube, whereby said tube may be thrown into and out of registration with opening $a$ in the usual manner by the check-row. (Not shown in the drawings.) $d^2$ is a spring adapted to normally hold said tube out of registration with said opening $a$, as shown in dotted lines, Fig. 1. The rear portion of said tube C is preferably cut away, as shown at $c^3$, except for the brace-pieces $c^4$ $c^4$, and is provided with a plate E, which is hinged at $c$ and constructed to work in said cut-away portion, whereby it may be operated to close said tube C when in registration with opening $a$, as shown in Fig. 3. Said plate E is constructed to be operated by a lever F, secured thereto on the outside of the chute B and retained in position by the stops $f f$. (Shown in Fig. 1.)

G is a plate hinged to the lower end of plate E at $g$ and provided with a slot $g'$, constructed to receive a pin $g^2$ on said tube.

H is a projection directly under the tube C and adapted to close the same when out of registration with opening $a$.

With this construction when it is desirable to accomplish drill planting the check-row shaft is disconnected from the check-row. The tube C is then thrown into registration with the opening $a$ and the lever F locked in the position shown in full lines, Fig. 1, whereupon the plate E will be thrown backward, thereby forcing the plate G into a position approximately parallel with the front of the tube C, thus forming an unobstructed passage for the kernels as they are discharged from the opening $a$, as shown in Fig. 2. On the other hand, when check-row planting is desired the check-row shaft is connected to the check-row in the ordinary manner and the lever F thrown into the position shown in dotted lines, Fig. 1, thereby throwing forward the plate E, so as to close the tube C when in registration with the opening $a$. Said plate G is at the same time tilted, as shown in Fig. 3, so that the kernels will not strike against it when discharged, but which when the tube is shifted out of engagement with the opening $a$ will be forced to close the cut-away portion in the rear of the tube to prevent the kernels from being accidentally discharged, as shown in Fig. 4.

The operation of the device with the parts in the positions just described is obvious and is as follows: The kernels upon being discharged from the hopper will collect on the projection $c'$, as shown in Fig. 4, until the check-row throws the tube C into registration with the opening $a$, as shown in Fig. 3, whereupon the kernels will pass down said tube and collect upon plate E, after which the tube will again be thrown out of registration with opening $a$ by spring $d^2$, thereby depositing the kernels in the projection H. The tube will then be shifted again by the check-row discharging the group of kernels to the ground, and it is obvious that inasmuch as the plate G is thrown back, as shown, there is nothing for the kernels to strike to prevent their discharge from being simultaneous.

What I claim, and desire to secure by Letters Patent, is—

1. In a discharge-chute for a corn-planter, the combination with a pivotally-mounted tube having a cut-away portion on its rear side adjacent to its end and forming part of the discharge-opening thereof, a check-rowing device operatively connected with said tube for oscillating the same into and out of position to discharge grain therefrom, a movable part adapted to close said cut-away portion of the tube and connections for automatically moving said part to open said cut-away portion when the tube is moved into position to discharge the grain, to facilitate its discharge, therefrom, substantially as described.

2. In a discharge-chute for a corn-planter, the combination with a pivotally-mounted tube having a cut-away portion, on its rear side adjacent to its end and forming part of the discharge-opening thereof, a check-rowing device operatively connected with said tube for oscillating the same into and out of position to discharge grain therefrom, a plate pivoted in said cut-away portion of said tube and adapted to close said cut-away portion and connections for automatically operating said plate to open said cut-away portion when the tube is moved into position to discharge the grain to facilitate its discharge therefrom, substantially as described.

3. In a discharge-chute for a corn-planter, the combination with a pivotally-mounted tube having a cut-away portion, on its rear side adjacent to its discharge end, a check-rowing device operatively connected with said tube for oscilliating the same into and out of position to discharge grain therefrom, a plate slidingly mounted in said cut-away portion of the tube and adapted to close said cut-away portion, and connections for automatically operating said plate to open said cut-away portion when the tube is moved into position to discharge the grain, to facilitate its discharge therefrom, substantially as described.

4. In a discharge-chute for a corn-planter, the combination with a pivotally-mounted tube having a cut-away portion on its rear side adjacent to its discharge end, a check-rowing device operatively connected with said tube for oscillating the same into and out of position to discharge grain therefrom, a projection in said chute adapted to close the discharge end of the tube when in operative position, a plate in said cut-away portion of the tube and also constructed to receive a vertical sliding movement and adapted to close said cut-away portion, and connections for automatically operating said plate to open said cut-away portion when the tube is moved into position to discharge the grain, to facilitate its discharge therefrom, substantially as described.

5. In a discharge-chute for a corn-planter, the combination with a pivotally-mounted tube having a cut-away portion, on its rear side adjacent to its discharge end, a check-rowing device operatively connected with said tube for oscillating the same into and out of position to discharge the grain therefrom, a movable part adapted to close said cut-away portion of the tube, connections for automatically moving said part to open said cut-away portion when the tube is moved into position to discharge the grain, and hand-controlled means for closing cut-away portion when the tube is in position to discharge for drill planting, substantially as described.

6. In a discharge-chute for a corn-planter, the combination with a pivotally-mounted tube having a cut-away portion, on its rear side adjacent to its discharge end, a check-rowing device operatively connected with said tube for oscillating the same into and out of position to discharge grain therefrom, a plate pivoted in said chute and constructed to operate in said cut-away portion of the tube to close said tube, and a plate located in said cut-away portion beneath said pivoted plate and hinged thereto, said lower plate being provided with a slot adapted to receive a pin on said tube, whereby said plate will close said cut-away when said tube is in inoperative position and will open the same when said tube is in position to discharge the grain to facilitate its discharge therefrom, substantially as described.

7. In a discharge-chute for a corn-planter, the combination with a pivotally-mounted tube having a cut-away portion, on its rear side adjacent to its discharge end, a check-rowing device operatively connected with said tube for oscillating the same into and out of position to discharge grain therefrom, a plate pivoted in said chute and constructed to operate in said cut-away portion of the tube to close said tube, a plate located in said cut-away portion beneath said pivoted plate and hinged thereto, said lower plate being provided with a slot adapted to receive a pin on said tube whereby said plate will open said cut-away portion when the tube is in position to discharge the grain and means to throw said upper plate into and out of operative position, whereby said lower plate may be operated to close said cut-away portion in said tube when the same is in position to discharge for drill planting, substantially as described.

8. In a device of the kind described, the combination with a chute, of a tube pivotally mounted therein and provided at the rear of lower end with a cut-away portion, said tube being adapted to be thrown into registration with the discharge-opening of the hopper for drill planting, said tube being provided with a projection to close said discharge-opening in the hopper when said tube is out of registration therewith, said discharge-chute being provided with a projection constructed to close said tube, when out of registration with said opening, a plate pivoted in said chute and extending through said cut-away portion into said tube to close said tube when out of registration with said opening, a lever outside of said chute connected with said pivoted plate, means for retaining said lever in different positions whereby said plate may be adjusted into operative and inoperative position, a plate located in said cut-away portion of said tube beneath said pivoted plate and hinged thereto, said lower plate being provided with a slot to receive a pin on said tube and connecting said tube with the check-rowing device, substantially as described.

In testimony whereof I affix my signature in the presence of two witnesses.

WILLIAM L. BEALL.

Witnesses:
M. L. DEAN,
G. W. BORTLES.